(12) United States Patent
Kim et al.

(10) Patent No.: US 11,682,809 B2
(45) Date of Patent: Jun. 20, 2023

(54) POUCH-TYPE SECONDARY BATTERY AND POUCH FOR SECONDARY BATTERY (71) Applicant: LG Chem, Ltd., Seoul (KR)

(72) Inventors: Kyung Min Kim, Daejeon (KR); Bum Young Jung, Daejeon (KR)

(73) Assignee: LG Energy Solution, Ltd.

( * ) Notice: Subject to any disclaimer, the term of this patent is extended or adjusted under 35 U.S.C. 154(b) by 85 days.

(21) Appl. No.: 16/755,796

(22) PCT Filed: Jul. 2, 2019

(86) PCT No.: PCT/KR2019/008076
§ 371 (c)(1),
(2) Date: Apr. 14, 2020

(87) PCT Pub. No.: WO2020/045814
PCT Pub. Date: Mar. 5, 2020

(65) Prior Publication Data
US 2021/0083233 A1     Mar. 18, 2021

(30) Foreign Application Priority Data
Aug. 29, 2018 (KR) .................. 10-2018-0101950

(51) Int. Cl.
*H01M 50/124* (2021.01)
*H01M 50/557* (2021.01)
(Continued)

(52) U.S. Cl.
CPC ........... *H01M 50/124* (2021.01); *B32B 15/04* (2013.01); *H01M 50/105* (2021.01);
(Continued)

(58) Field of Classification Search
CPC ............ H01M 50/557; H01M 50/124; H01M 50/531; H01M 50/116; H01M 50/543;
(Continued)

(56) References Cited

U.S. PATENT DOCUMENTS

2005/0014036 A1*  1/2005  Kim ................... H01M 50/571
                                                                429/7
2005/0260492 A1   11/2005 Tucholski et al.
(Continued)

FOREIGN PATENT DOCUMENTS

CN    101345323 A    1/2009
CN    102956862 A    3/2013
(Continued)

OTHER PUBLICATIONS

English translation of KR 20140148121A, Pouch Case and Secondary Battery including same, LG Chem. LTD., 2014 (Year: 2014).*

(Continued)

*Primary Examiner* — Niki Bakhtiari
*Assistant Examiner* — Adam J Francis
(74) *Attorney, Agent, or Firm* — Lerner David LLP (57) ABSTRACT

A pouch-type secondary battery includes: an electrode assembly in which a positive electrode, a separator, and a negative electrode are laminated; and a pouch configured to accommodate the electrode assembly, wherein the pouch includes: a surface protection layer made of a first polymer and formed at an outermost layer; a sealant layer made of a second polymer and formed at an innermost layer; a gas barrier layer made of a first metal and laminated between the surface protection layer and the sealant layer; and a metal foil layer made of a second metal, laminated between the surface protection layer and the sealant layer, and connected to the negative electrode of the electrode assembly.

13 Claims, 8 Drawing Sheets

(51) Int. Cl.
  *B32B 15/04*      (2006.01)
  *H01M 50/178*     (2021.01)
  *H01M 50/121*     (2021.01)
  *H01M 50/105*     (2021.01)
  *H01M 50/536*     (2021.01)
  *H01M 50/14*      (2021.01)
  *H01M 50/129*     (2021.01)
  *H01M 50/128*     (2021.01)
  *H01M 50/119*     (2021.01)
  *H01M 50/55*      (2021.01)
  *H01M 50/562*     (2021.01)

(52) U.S. Cl.
  CPC ....... *H01M 50/119* (2021.01); *H01M 50/121* (2021.01); *H01M 50/128* (2021.01); *H01M 50/129* (2021.01); *H01M 50/1243* (2021.01); *H01M 50/1245* (2021.01); *H01M 50/14* (2021.01); *H01M 50/178* (2021.01); *H01M 50/536* (2021.01); *H01M 50/55* (2021.01); *H01M 50/557* (2021.01); *H01M 50/562* (2021.01); *H01M 2220/20* (2013.01); *H01M 2220/30* (2013.01)

(58) Field of Classification Search
  CPC ............. H01M 50/10; H01M 50/1243; H01M 50/1245; H01M 2220/20; H01M 2220/30; H01M 50/545; H01M 50/553; H01M 50/555; H01M 50/119; H01M 50/121; H01M 50/128; H01M 50/105; B32B 15/04
  See application file for complete search history.

(56) References Cited

U.S. PATENT DOCUMENTS

| | | | |
|---|---|---|---|
| 2006/0159990 A1 | 7/2006 | Ryu et al. | |
| 2011/0008670 A1* | 1/2011 | Han | H01M 4/661 429/163 |
| 2012/0244421 A1* | 9/2012 | Yamazaki | H01M 50/178 429/176 |
| 2013/0045406 A1 | 2/2013 | Ahn | |
| 2015/0325819 A1* | 11/2015 | Minamitani | H01M 50/121 156/60 |
| 2016/0056421 A1* | 2/2016 | Kim | B32B 27/306 428/354 |
| 2016/0089861 A1 | 3/2016 | Wang et al. | |
| 2017/0194606 A1 | 7/2017 | Lim et al. | |
| 2018/0366692 A1 | 12/2018 | Ueda et al. | |
| 2020/0013996 A1 | 1/2020 | Song et al. | |
| 2020/0295316 A1 | 9/2020 | Kim et al. | |

FOREIGN PATENT DOCUMENTS

| | | | |
|---|---|---|---|
| CN | 106469824 A | 3/2017 | |
| CN | 207381438 U | 5/2018 | |
| EP | 0975031 A1 | 1/2000 | |
| EP | 3509122 A1 | 7/2019 | |
| JP | 2000251857 A | 9/2000 | |
| JP | 2001297795 A | 10/2001 | |
| JP | 2005183051 A | 7/2005 | |
| JP | 2006527474 A | 11/2006 | |
| JP | 2013222687 A | 10/2013 | |
| JP | 2014086361 A | 5/2014 | |
| JP | 2015153698 A | 8/2015 | |
| JP | 2016068391 A | 5/2016 | |
| JP | 2020511744 A | 4/2020 | |
| KR | 20090076280 A | 7/2009 | |
| KR | 20110071638 A | 6/2011 | |
| KR | 101089161 B1 | 12/2011 | |
| KR | 101220575 B1 | 1/2013 | |
| KR | 20140059650 A | 5/2014 | |
| KR | 20140148121 A * | 12/2014 | ............. H01M 2/02 |
| KR | 20160019246 A | 2/2016 | |
| KR | 20170111636 A | 10/2017 | |
| KR | 20180045667 A | 5/2018 | |
| TW | 201711247 A | 3/2017 | |
| WO | 2011109060 A1 | 9/2011 | |
| WO | 2017110062 A1 | 6/2017 | |
| WO | 2018052199 A1 | 3/2018 | |

OTHER PUBLICATIONS

International Search Report for PCT/KR2019/008076 dated Oct. 8, 2019; 2 pages.
Extended European Search Report including Written Opinion for Application No. EP19854713.5, dated Nov. 20, 2020, pp. 1-8.
Search Report dated Dec. 13, 2021 from the Office Action for Chinese Application No. 201980004498.X dated Dec. 17, 2021, 3 pages.

* cited by examiner

POUCH-TYPE SECONDARY BATTERY AND POUCH FOR SECONDARY BATTERY

CROSS-REFERENCE TO RELATED APPLICATIONS

The present application is a national phase entry under 35 U.S.C. § 371 of International Application No. PCT/KR2019/008076, filed Jul. 2, 2019, which claims the benefit of the priority of Korean Patent Application No. 10-2018-0101950, filed on Aug. 29, 2018, both of the disclosures of which are hereby incorporated by reference in their entirety.

TECHNICAL FIELD

The present invention relates to a pouch-type secondary battery and a pouch for a secondary battery, and more particularly, to a pouch-type secondary battery that reduces a heat generation rate and easily releases heat to the outside to reduce a risk of explosion even if a sharp nail passes therethrough, and a pouch for a secondary battery.

BACKGROUND ART

In general, secondary batteries include nickel-cadmium batteries, nickel-hydrogen batteries, lithium ion batteries, and lithium ion polymer batteries. Such a secondary battery is being applied to and used in small-sized products such as digital cameras, P-DVDs, MP3Ps, mobile phones, PDAs, portable game devices, power tools, E-bikes, and the like as well as large-sized products requiring high power such as electric vehicles and hybrid vehicles, power storage devices for storing surplus power or renewable energy, and backup power storage devices.

Such a secondary battery is classified into a pouch type secondary battery and a can type secondary battery according to a material of a case accommodating the electrode assembly. In the pouch type secondary battery, an electrode assembly is accommodated in a pouch made of a flexible polymer material. Also, in the can type secondary battery, an electrode assembly is accommodated in a case made of a metal or plastic material.

Figure 1:
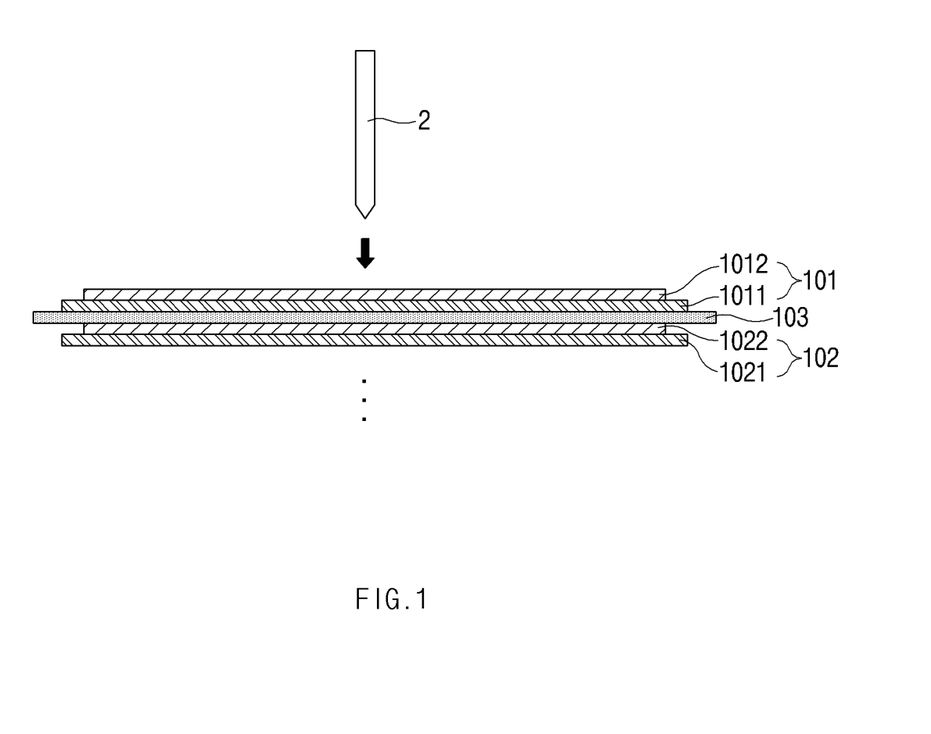
FIG. 1 is a schematic view illustrating a state in which a nail approaches an electrode assembly according to a related art.
Figure 2:
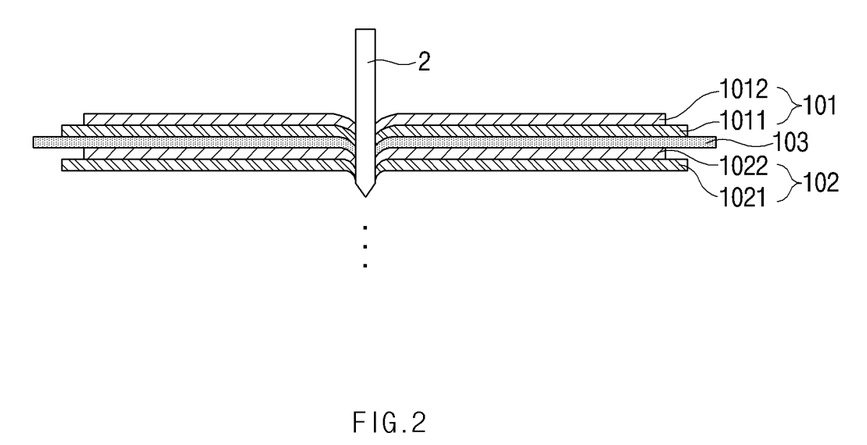
FIG. 2 is a schematic view illustrating a state in which the nail passes through the electrode assembly according to the related art.

FIG. 1 is a schematic view illustrating a state in which a nail 2 approaches an electrode assembly 10 according to the related art, and FIG. 2 is a schematic view illustrating a state in which the nail 2 passes through the electrode assembly 10 according to the related art.

To manufacture the electrode assembly 10, first, slurry of a positive electrode active material 1012 is applied to a positive electrode collector 1011, and slurry of a negative electrode active material 1022 is applied to a negative electrode collector 1021 to manufacture a positive electrode 101 and a negative electrode 102. Also, a separator 103 is disposed between the positive electrode 101 and the negative electrode 102, which are manufactured, and then, the positive electrode 101, the separator 103, and the negative electrode 102 are laminated to manufacture the electrode assembly 10 as illustrated in FIG. 1. Although only one unit cell in which one positive electrode 101, one negative electrode 102, and one separator 103 are laminated is illustrated in FIG. 1, the electrode assembly 10 is not limited thereto. For example, a plurality of unit cells may be further laminated.

When the electrode assembly 10 is accommodated in a case to be sealed, a secondary battery 1 is manufactured. However, while the secondary battery 1 is actually used, an accident may occur due to a collision with the outside. For example, a sharp object may pass through the secondary battery 1, and thus, the positive electrode 101 and the negative electrode 102 may directly contact each other to cause short circuit. Due to the short circuit, a large amount of gas may be generated at a high speed in a short time, and a high temperature rise may occur. Furthermore, large explosion may occur to lead to a major accident.

Thus, before the secondary battery 1 is actually used, as illustrated in FIGS. 1 and 2, a penetration test of a nail 2, in which the nail 2 is penetrated to determine an explosion risk, is performed as one of safety tests.

However, in general, when the penetration test of the nail 2 is performed, the secondary battery 1 may reach the highest temperature quickly when the positive electrode collector 1011 and the negative electrode active material 1022 contact each other, and thus, large explosion may occur. Thus, the contact between the positive electrode collector 1011 and the negative electrode active material 1022 is known as the most dangerous contact. However, if the positive electrode 101 is laminated on the outermost side of the electrode assembly 10, as illustrated in FIG. 2, there is a problem that possibility of occurrence of the large explosion is very high because the positive electrode collector 1011 and the negative electrode active material 1022 are the closest to each other.

DISCLOSURE OF THE INVENTION

Technical Problem

A problem to be solved by the present invention is to provide a pouch-type secondary battery that reduces a heat generation rate and easily releases heat to the outside to reduce a risk of explosion even if a sharp nail passes therethrough, and a pouch for a secondary battery.

The objects of the present invention are not limited to the aforementioned object, but other objects not described herein will be clearly understood by those skilled in the art from descriptions below.

Technical Solution

To solve the above problem, a pouch-type secondary battery according to an embodiment of the present invention includes: an electrode assembly in which a positive electrode, a separator, and a negative electrode are laminated; and a pouch configured to accommodate the electrode assembly, wherein the pouch includes: a surface protection layer made of a first polymer and formed at an outermost layer; a sealant layer made of a second polymer and formed at an innermost layer; a gas barrier layer made of a first metal and laminated between the surface protection layer and the sealant layer; and a metal foil layer made of a second metal, laminated between the surface protection layer and the sealant layer, and connected to the negative electrode of the electrode assembly.

Also, the metal foil layer may be connected to a negative electrode lead extending from the negative electrode so as to be connected to the negative electrode.

Also, portions of the surface protection layer, the sealant layer, and the gas barrier layer may be removed from a specific area corresponding to an area on which the negative electrode lead exists.

Also, the negative electrode lead may be welded and connected to the metal foil layer exposed through the specific area.

Also, the pouch-type secondary battery may further include an insulation layer, which insulates the gas barrier layer from the metal foil layer, between the gas barrier layer and the metal foil layer.

Also, the metal foil layer may be clad-rolled together with the gas barrier layer.

Also, the first polymer may include polyethylene terephthalate (PET).

Also, the first metal may include aluminum.

Also, the second metal may include the same kind of metal as a metal contained in a negative electrode collector of the negative electrode.

Also, the second metal may include copper.

Also, the second polymer may include polypropylene.

To solve the above problem, a pouch for a pouch-type secondary battery, which is configured to accommodate an electrode assembly in which a positive electrode, a separator, and a negative electrode are laminated, according to an embodiment of the present invention includes: a surface protection layer made of a first polymer and formed at an outermost layer; a sealant layer made of a second polymer and formed at an innermost layer; a gas barrier layer made of a first metal and laminated between the surface protection layer and the sealant layer; and a metal foil layer made of a second metal, laminated between the surface protection layer and the sealant layer, and connected to the negative electrode of the electrode assembly, wherein portions of the surface protection layer, the sealant layer, and the gas barrier layer are removed from a specific area to expose the metal foil layer to the outside.

Also, the specific area may correspond to an area on which a negative electrode lead extending from the negative electrode exists.

Also, the negative electrode lead may be welded and connected to the metal foil layer exposed through the specific area.

Also, the pouch for the pouch-type secondary battery may further include an insulation layer, which insulates the gas barrier layer from the metal foil layer, between the gas barrier layer and the metal foil layer.

Also, the metal foil layer may be clad-rolled together with the gas barrier layer.

The present invention also provides a battery module including the pouch-type secondary battery as a unit battery, a battery pack including the battery module, and a device including the battery pack.

The device may include a computer, a notebook, a smart phone, a mobile phone, a tablet PC, a wearable electronic device, a power tool, an electric vehicle (EV), a hybrid electric vehicle (HEV), a plug-in hybrid electric vehicle (PHEV), or a power storage device, but is not limited thereto.

The structures of the battery module and the device and the method for manufacturing them are well known in the art, and thus their detailed descriptions will be omitted herein.

Particularities of other embodiments are included in the detailed description and drawings.

Advantageous Effects

The embodiments of the present invention may have at least the following effects.

Even though the sharp nail passes through the secondary battery, the short circuit between the metal foil layer and the positive electrode active material may be induced first before the most dangerous short circuit between the positive electrode collector and the negative electrode active material to reduce the heat generation rate and easily release the heat to the outside, thereby reducing the risk of the explosion.

The effects of the prevent invention are not limited by the aforementioned description, and thus, more varied effects are involved in this specification.

MODE FOR CARRYING OUT THE INVENTION

Advantages and features of the present disclosure, and implementation methods thereof will be clarified through following embodiments described with reference to the accompanying drawings. The present invention may, however be embodied in different forms and should not be construed as limited to the embodiments set forth herein. Rather, these embodiments are provided so that this disclosure will be thorough and complete, and will fully convey the scope of the present invention to those skilled in the art. Further, the present invention is only defined by scopes of claims. Like reference numerals refer to like elements throughout.

Unless terms used in the present invention are defined differently, all terms (including technical and scientific terms) used herein have the same meaning as generally understood by those skilled in the art. Also, unless defined clearly and apparently in the description, the terms as defined in a commonly used dictionary are not ideally or excessively construed as having formal meaning.

In the following description, the technical terms are used only for explaining a specific exemplary embodiment while not limiting the present invention. In this specification, the terms of a singular form may comprise plural forms unless specifically mentioned. The meaning of "comprises" and/or "comprising" does not exclude other components besides a mentioned component.

Hereinafter, preferred embodiments will be described in detail with reference to the accompanying drawings.

Figure 3:
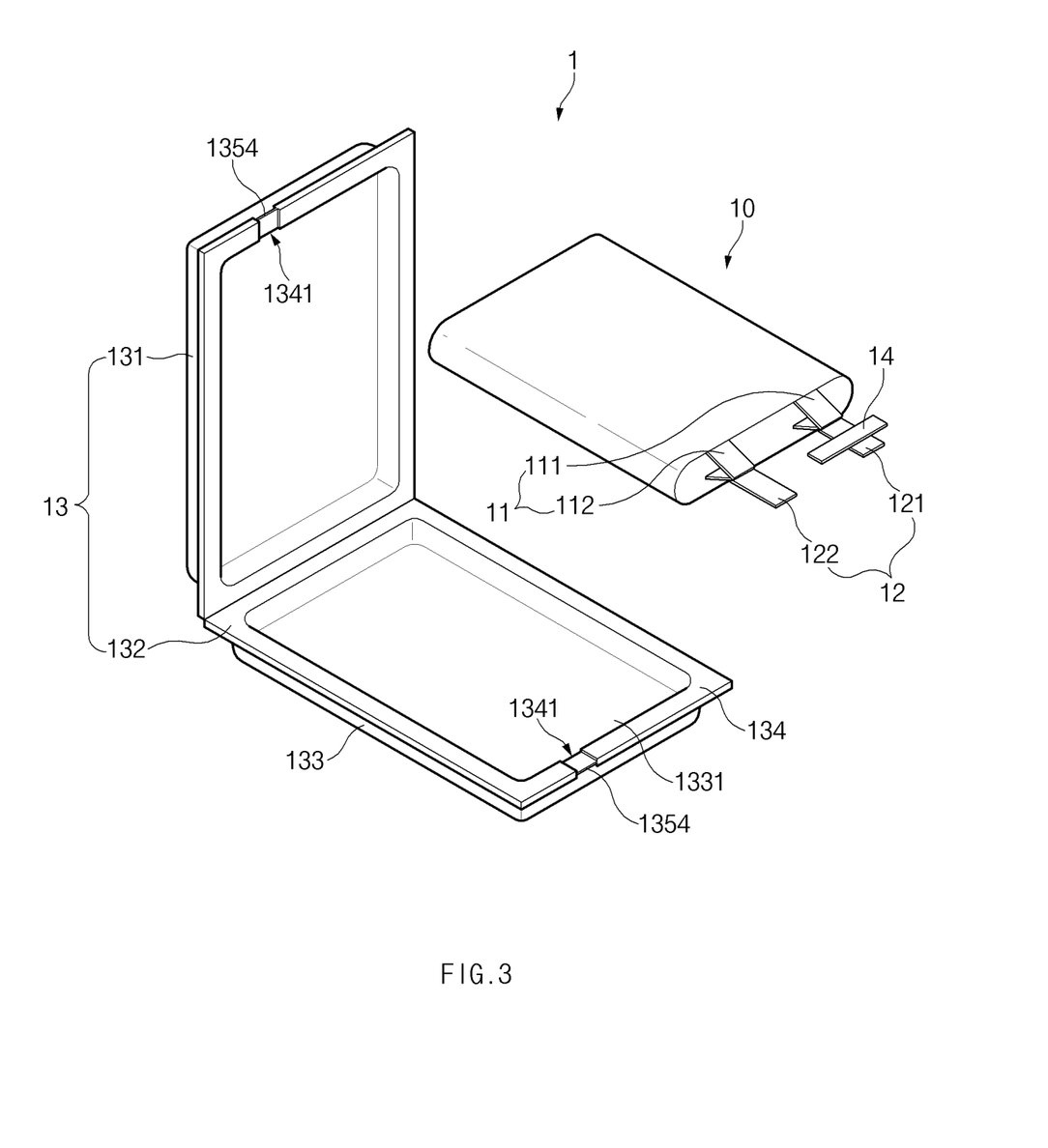
FIG. 3 is an assembled view of a secondary battery according to an embodiment of the present invention.

FIG. 3 is an assembled view of a secondary battery 1 according to an embodiment of the present invention.

To manufacture the secondary battery 1 according to an embodiment of the present invention, first, slurry of a positive electrode active material 1012 is applied to a positive electrode collector 1011, and slurry of a negative electrode active material 1022 is applied to a negative electrode collector 1021 to manufacture a positive electrode 101 and a negative electrode 102. Also, the positive electrode 101 and the negative electrode 102 may be laminated on both sides of a separator 103 to manufacture an electrode assembly 10 having a predetermined shape. Also, the electrode assembly 10 may be accommodated in a battery case, and then, an electrolyte may be injected into the battery case to seal the battery case.

As illustrated in FIG. 3, the electrode assembly 10 includes electrode tabs 11, including a positive electrode tab 111 and a negative electrode tab 112. Positive electrode tab 111 is connected to the positive electrode 101, and negative electrode tab 112 is connected to the negative electrode 102 of the electrode assembly 10, such that positive electrode tab 111 and negative electrode tab 112 protrude to the outside of the electrode assembly 10, thereby providing a path, through which electrons move, between the inside and outside of the electrode assembly 10. The electrode collector of the electrode assembly 10 is constituted by a portion coated with slurry of electrode active materials 1012 and 1022 and a distal end, on which the slurry of the electrode active materials 1012 and 1022 are not applied, i.e., a non-coating portion. Also, the electrode tabs 11 may be formed by cutting the non-coating portion or by connecting a separate conductive member to the non-coating portion through ultrasonic welding. As illustrated in FIG. 1, the electrode tabs 11 may protrude from one side of the electrode assembly 10 in the same direction, but the present invention is not limited thereto. For example, the electrode tabs 11 may protrude in directions different from each other.

In the electrode assembly 10, the electrode lead 12 is connected to the electrode tab 11 through spot welding. Also, a portion of the electrode lead 12 is surrounded by an insulation part 14. However, according to an embodiment of the present invention, it is preferable that the insulation part 14 surrounds only the periphery of the positive electrode lead 121 of the electrode lead 12 and does not surround the periphery of the negative electrode lead 122. The insulation part 14 may be disposed to be limited within a sealing part 134, to which an upper pouch 131 and a lower pouch 132 of a pouch 13 are thermally fused, so that the electrode lead 12 is bonded to the pouch 13. Also, electricity generated from the electrode assembly 10 may be prevented from flowing to the pouch 13 through the electrode lead 12, and the sealing of the pouch 13 may be maintained. Thus, the insulation part 14 may be made of a nonconductor having non-conductivity, which is not electrically conductive. In general, although an insulation tape which is easily attached to the electrode lead 12 and has a relatively thin thickness is mainly used as the insulation part 14, the present invention is not limited thereto. For example, various members may be used as the insulation part 14 as long as the members are capable of insulating the electrode lead 12.

The electrode lead 12 may extend in the same direction or extend in directions different from each other according to the formation positions of the positive electrode tab 111 and the negative electrode tab 112. The positive electrode lead 121 and the negative electrode lead 122 may be made of materials different from each other. That is, the positive electrode lead 121 may be made of the same material as the positive electrode collector 1011, i.e., an aluminum (Al) material, and the negative electrode lead 122 may be made of the same material as the negative electrode collector, i.e., a copper-containing metal material such as a copper (Cu) material or a copper material coated with nickel (Ni). Also, a portion of the electrode lead 12, which protrudes to the outside of the pouch 13, may be provided as a terminal part so as to be electrically connected to an external terminal. Also, according to an embodiment of the present invention, the negative electrode lead 122 is connected to a metal foil layer 1354 provided in the pouch 13. This will be described below in detail.

In the pouch-type secondary battery 1 according to an embodiment of the present invention, the battery case may be the pouch 13 made of a flexible material. Hereinafter, it is explained that the battery case is the pouch 13. Also, the pouch 13 accommodates the electrode assembly 10 so that a portion of the electrode lead 12, i.e., the terminal part is exposed and then is sealed. As illustrated in FIG. 3, the pouch 13 includes an upper pouch 131 and a lower pouch 132. A cup part 133 having an accommodation space 1331 capable of accommodating the electrode assembly 10 is formed in the lower pouch 132, and the upper pouch 131 covers an upper portion of the accommodation space 1331 to prevent the electrode assembly 10 from being separated to the outside of the pouch 13. Here, as illustrated in FIG. 3, the cup part 133 having the accommodation space 1331 may be formed in the upper pouch 131 to accommodate the electrode assembly 10 in the upper portion. As illustrated in FIG. 3, one side of the upper pouch 131 and one side of the lower pouch 132 may be connected to each other. However, the present invention is not limited thereto. For example, the upper pouch 131 and the lower pouch may be separately manufactured to be separated from each other.

After the upper pouch 131 and the lower pouch 132 of the pouch 13 contact each other, the sealing part 134 formed on an edge may be sealed. Here, according to an embodiment of the present invention, some layers may be removed from a partial specific area 1341 of the sealing part 134 of the pouch 13 to expose the metal foil layer 1354. Thus, the negative electrode lead 122 may be easily welded and connected to the metal foil layer 1354. This will be described below in detail.

As described above, when the electrode lead 12 is connected to the electrode tab 11 of the electrode assembly 10, and the insulation part 14 is formed on a portion of the electrode lead 12, particularly, the positive electrode lead 121, the electrode assembly 10 may be accommodated in the accommodation space 1331 provided in the lower pouch 132, and the upper pouch 131 may cover the upper side of the accommodation space 1331. Also, when the electrolyte is injected, and the sealing part 154 formed on the edge of each of the upper pouch 131 and the lower pouch 132 is sealed, the secondary battery 1 is manufactured.

Figure 4:
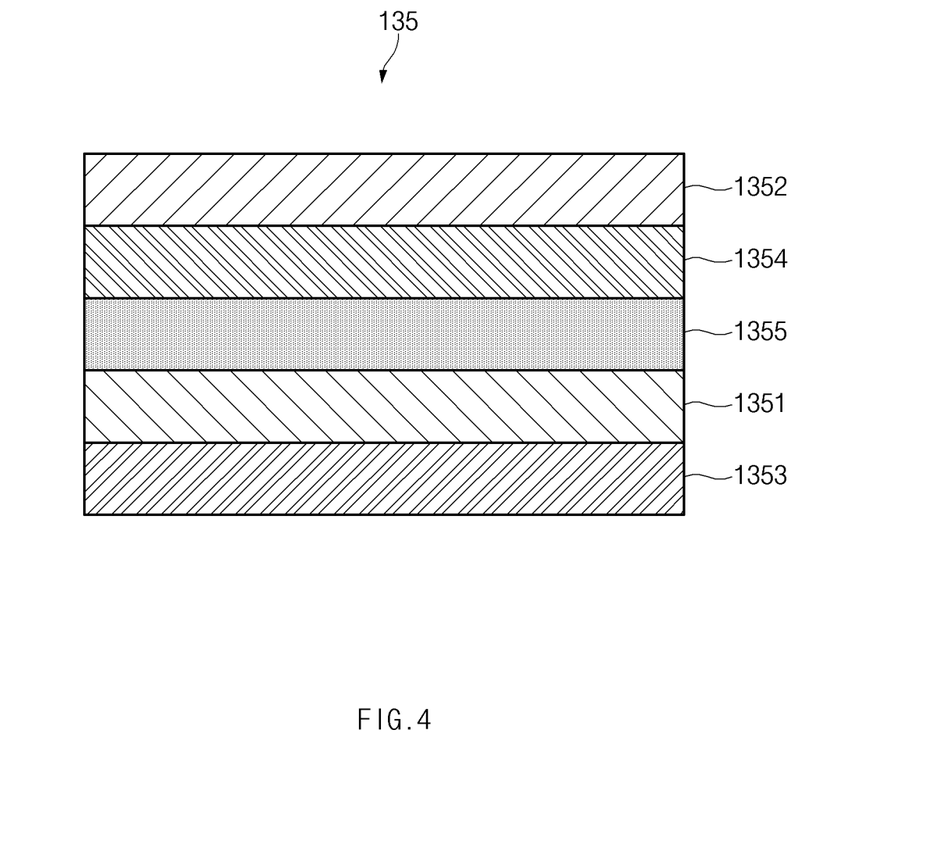
FIG. 4 is a cross-sectional view illustrating a portion of a pouch according to an embodiment of the present invention.

FIG. 4 is a partial cross-sectional view of the pouch 13 according to an embodiment of the present invention.

According to an embodiment of the present invention, even though the sharp nail 2 passes through the secondary battery 1, a heat generation rate may be reduced, and heat may be easily released to the outside to reduce a risk of explosion. For this, the secondary battery 1 according to an embodiment of the present invention includes: an electrode assembly 10 in which a positive electrode 101, a separator 103, and a negative electrode 102 are laminated; and a pouch 13 accommodating the electrode assembly 10. The pouch 13 includes: a surface protection layer 1352 made of a first polymer and formed at the outermost layer; a sealant layer 1353 made of a second polymer and formed at the innermost layer; a gas barrier layer 1351 made of a first metal and laminated between the surface protection layer 1352 and the sealant layer 1353; and a metal foil layer 1354 made of a second metal, laminated between the surface protection layer 1352 and the sealant layer 1353, and connected to the negative electrode 102 of the electrode assembly 10. Also, portions of the surface protection layer 1352, the sealant layer 1353, and the gas barrier layer 1351 may be removed from a specific area 1341 of the pouch 13 to expose the metal foil layer 1354 to the outside.

The pouch 13 is manufactured by drawing a pouch film 135. That is, the pouch film 135 is elongated by using a punch or the like to form a cup part 133, thereby manufacturing the pouch 13. According to an embodiment of the present invention, as illustrated in FIG. 4, the pouch film 135 includes the gas barrier layer 1351, the surface protection layer 1352, the sealant layer 1353, and the metal foil layer 1354.

The gas barrier layer 1351 may secure mechanical strength of the pouch 13, block introduction and discharge of a gas or moisture outside the secondary battery 1, and prevent the electrolyte from leaking. In general, the gas barrier layer 1351 is made of the first metal, and the first metal may include aluminum. Aluminum may secure the mechanical strength of a predetermined level or more, but be light in weight. Thus, aluminum may secure complement and heat dissipation for electrochemical properties of the electrode assembly 10 and the electrolyte. However, the present invention is not limited thereto. For example, the gas barrier layer 1351 may be made of various materials. For example, the gas barrier layer 1351 may be made of one material or a mixture of two or more materials selected from the group consisting of Fe, C, Cr, Mn, Ni and Al. Here, the gas barrier layer 1351 is made of a material containing iron, the mechanical strength may be improved. When the gas barrier layer 1351 is made of a material containing aluminum, flexibility may be improved. Thus, the material forming the gas barrier layer 1351 may be used in consideration of the characteristics of the gas barrier layer 1351.

The surface protection layer 1352 is made of the first polymer and disposed at the outermost layer to protect the secondary battery 1 against external friction and collision and also electrically insulates the electrode assembly 10 from the outside. Here, the outermost layer represents a layer disposed at the last when oriented in a direction opposite to the direction in which the electrode assembly 10 is disposed with respect to the gas barrier layer 1351. The first polymer forming the surface protection layer 1352 may include at least one or more materials selected from the group consisting of polyethylene, polypropylene, polycarbonate, polyethylene terephthalate (PET), polyvinyl chloride, acrylic polymer, polyacrylonitrile, polyimide, polyamide, cellulose, aramid, nylon, polyester, polyparaphenylene benzobisoxazole, polyarylate, teflon, and glass fiber. Particularly, a polymer such as a nylon resin or polyethylene terephthalate (PET) having mainly abrasion resistance and heat resistance is used. Also, the surface protection layer 1352 may have a single layer structure made of one material or a composite layer structure in which two or more materials are respectively formed as layers.

The sealant layer 1353 is made of the second polymer and disposed at the innermost layer to directly contact the electrode assembly 10. Here, the innermost layer represents a layer disposed at the last when oriented in a direction opposite to the direction in which the electrode assembly 10 is disposed with respect to the gas barrier layer 1351. The pouch 13 having a pouch shape may be manufactured while a portion of the pouch film 135 is stretched to form the cup part 133 having the accommodation space 1331 with a bag shape when the pouch film 135 having the lamination structure as described above is drawn by using the punch or the like. Also, when the electrode assembly 10 is accommodated in the accommodation space 1331, the electrolyte is injected. Thereafter, when the upper pouch 131 and the lower pouch 132 may contact each other, and thermal compression is applied to the sealing part 134, the sealant layers 1353 may be bonded to each other to seal the pouch 13. Here, since the sealant layer 1353 directly contacts the electrode assembly 10, the sealant layer 1353 may have to have insulating properties. Also, since the sealant layer 1353 contacts the electrolyte, the sealant layer 1353 may have to have corrosion resistance. Also, since the inside of the battery case 13 is completely sealed to prevent materials from moving between the inside and outside of the battery case 13, high sealability has to be realized. That is, the sealing part 134 in which the sealant layers 1353 are bonded to each other should have superior bonding strength. In general, the second polymer forming the sealant layer 1353 may include at least one or more materials selected from the group consisting of polyethylene, polypropylene, polycarbonate, polyethylene terephthalate, polyvinyl chloride, acrylic polymer, polyacrylonitrile, polyimide, polyamide, cellulose, aramid, nylon, polyester, polyparaphenylene benzobisoxazole, polyarylate, teflon, and glass fiber. Particularly, a polyolefin-based resin such as polypropylene (PP) or polyethylene (PE) may be used for the sealant layer 1353. Polypropylene (PP) is excellent in mechanical properties such as tensile strength, rigidity, surface hardness, abrasion resistance, and heat resistance and chemical properties such as corrosion resistance and thus is mainly used for manufacturing the sealant layer 1353. Furthermore, the sealant layer 1353 may be made of a casted polypropylene, an acid-treated polypropylene, or a polypropylene-butyleneethylene terpolymer. Here, the acid-treated polypropylene may be maleic anhydride polypropylene (MAH PP). Also, the sealant layer 1353 may have a single layer structure made of one material or a composite layer structure in which two or more materials are respectively formed as layers.

Like the gas barrier layer 1351, the metal foil layer 1354 is laminated between the surface protection layer 1352 and the sealant layer 1353 and connected to the negative electrode 102 of the electrode assembly 10. Thus, the metal foil layer 1354 may have a negative polarity to induce short circuit between the metal foil layer 1354 and the positive electrode active material 1012 even though the nail 2 passes therethrough, thereby reducing the risk of the explosion. For this, the metal foil layer 1354 is made of the second metal, and the second metal includes the same kind of metal as the metal contained in the negative electrode collector 1021. For example, the second metal may include a copper (Cu) material or a copper material coated with nickel (Ni), which is the same as that of the negative electrode collector 1021. The positions of the metal foil layer 1354 and the gas barrier layer 1351 may be exchanged with each other. That is, as illustrated in FIG. 4, the metal foil layer 1354 may be disposed above the gas barrier layer 1351, but is not limited thereto. For example, the metal foil layer 1354 may be disposed below the gas barrier layer 1351. If the metal foil layer 1354 is disposed below the gas barrier layer 1351, a distance between the metal foil layer 1354 and the positive electrode active material 1012 may be more reduced so that the metal foil layer 1354 and the positive electrode active material 1012 may more easily contact each other when the nail 2 passes. However, since the metal foil layer 1354 is connected to the negative electrode 102, the metal foil layer 1354 may have a negative polarity. Thus, according to an embodiment of the present invention, to prevent the gas barrier layer 1351 from having the polarity, the insulation layer 1355, which insulates the metal foil layer 1354 from the gas barrier layer 1351, may be further laminated between the metal foil layer 1354 and the gas barrier layer 1351. The insulation layer 1355 may be provided as a nonconductor having non-conductivity, which is not electrically conductive. Hereinafter, as illustrated in FIG. 4, the structure in which the metal foil layer 1354 is disposed above the gas barrier layer 1351 will be described.

Figure 5:
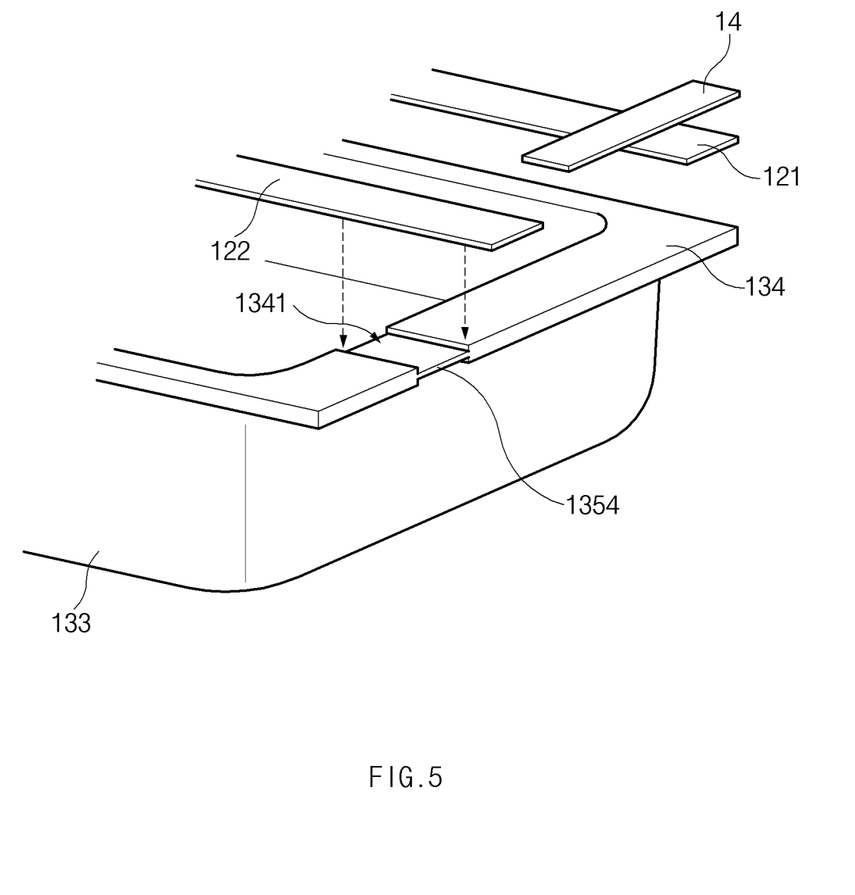
FIG. 5 is a detailed view illustrating a state in which a metal foil layer and a negative electrode lead are connected to each other according to an embodiment of the present invention.

FIG. 5 is a detailed assembled view illustrating a state in which the metal foil layer 1354 and a negative electrode lead 122 are connected to each other according to an embodiment of the present invention.

As described above, the metal foil layer 1354 is connected to the negative electrode 102 of the electrode assembly 10, particularly, the negative electrode lead 122 extending from the negative electrode 102. Particularly, the surface protection layer 1352, the sealant layer 1353, and the gas barrier layer 1351 are removed from the specific area 1341 of the sealing part 134 formed on the edge of the pouch 13, which corresponds to an area on which the negative electrode lead 122 exists. As a result, the metal foil layer 1354 may be exposed to the outside. Also, the negative electrode lead 122 contacts the metal foil layer 1354 exposed through the specific area 1341 in the pouch 13. Also, the negative electrode lead 122 and the metal foil layer 1354 may be easily welded to each other through laser welding or ultrasonic welding and then be connected to each other.

To easily weld the metal foil layer 1354 and the negative electrode lead 122 to each other through the laser welding, it is preferable that the metal foil layer 1354 is exposed to the outside as well as the inside on the specific area 1341. Thus, it is preferable that the surface protection layer 1352 is removed also from the specific area 1341. However, since the surface protection layer 1352 exists on the outside with respect to the metal foil layer 1352, the connection between the metal foil layer 1354 and the negative electrode lead 122 is not interrupted. Thus, if the negative electrode lead 122 and the metal foil layer 1354 are welded to each other without removing the surface protection layer 1352, only the sealant layer 1353 and the gas barrier layer 1351 may be removed from the specific area 1341, and the surface protection layer 1352 may not be removed.

FIG. 5 illustrates a state in which the metal foil layer 1354 is exposed on only the sealing part 134 of the lower pouch 132 and connected to the negative electrode lead 122. However, as described above, the upper pouch 131 and the lower pouch 132 may be separated from each other so as to be separately manufactured. Alternatively, even though one side of the upper pouch 131 and one side of the lower pouch 132 are connected to each other so as to be manufactured, a portion of the metal foil layer 1354 may be cut while being folded. For these various reasons, the metal foil layer 1354 of the upper pouch 131 and the metal foil layer 1354 of the lower pouch 132 may be electrically disconnected from each other. However, if the negative electrode lead 122 is connected to only the metal foil layer 1354 of the lower pouch 132, the risk of the explosion may not be reduced when the nail 2 passes from a side of the upper pouch 131. Thus, according to an embodiment of the present invention, as illustrated in FIG. 3, the surface protection layer 1352, the sealant layer 1353, and the gas barrier layer 1351 may be removed from the area corresponding to the negative electrode lead 122 in the upper pouch 131 as well as the lower pouch 132 to expose the metal foil layer 1354. Also, the negative electrode lead 122 is connected to the metal foil layer 1354 on each of the top and bottom surface thereof.

Since the surface protection layer 1352, the sealant layer 1353, and the gas barrier layer 1351 are removed from the area corresponding to the negative electrode lead 122, a stepped portion may be formed on the specific area 1341 of the sealing part 134 of the pouch 13. However, the insulation part 14 surrounds the periphery of the positive electrode lead 121, whereas the insulation part 14 does not surround the periphery of the negative electrode lead 122. Thus, even though the negative electrode lead 122 is directly welded and connected to the metal foil layer 1354, a deviation in sealing thickness between the positive electrode lead 121 and the negative electrode lead 122 may not be large. However, for example, in the case in which many layers are removed from the area corresponding to the negative electrode lead 122, or the insulation part 14 does not surround the periphery of the positive electrode lead 121, if the negative electrode lead 122 is directly welded to the metal foil layer 1354, the deviation in sealing thickness between the positive electrode lead 121 and the negative electrode lead 122 may be large. Thus, in this case, the negative electrode lead 122 may have a thickness greater than that of the positive electrode lead 121, or a protrusion protruding from the negative electrode lead 122 toward the metal foil layer 1354 may be formed to reduce the deviation.

Figure 6:
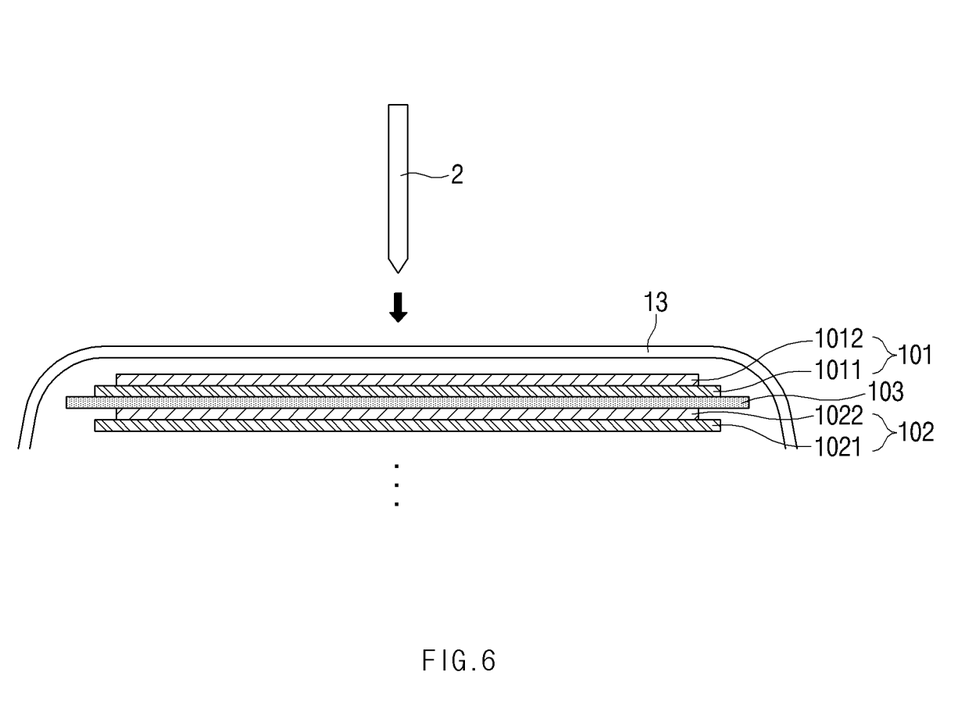
FIG. 6 is a schematic view illustrating a state in which a nail approaches the secondary battery according to an embodiment of the prevent invention.
Figure 7:
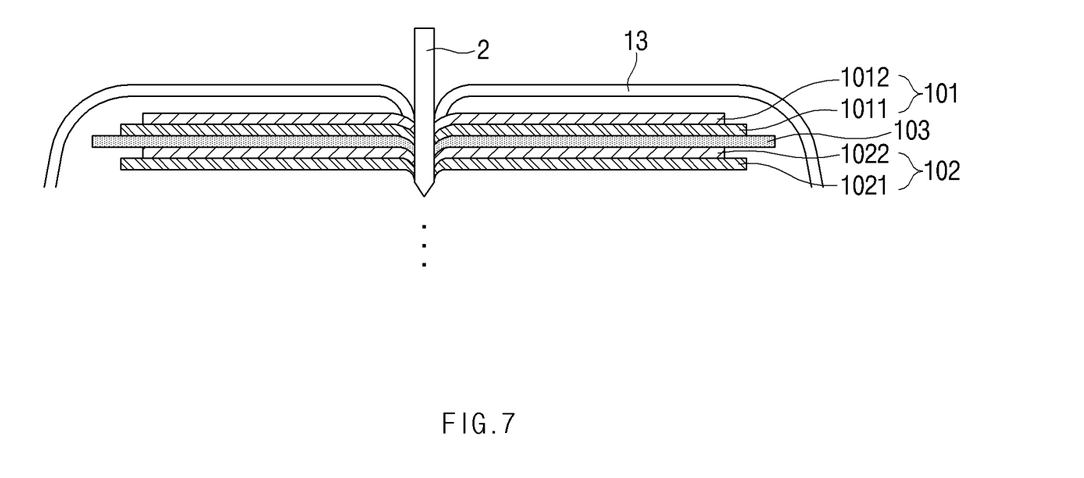
FIG. 7 is a schematic view illustrating a state in which the nail passes through the secondary battery according to an embodiment of the prevent invention.

FIG. 6 is a schematic view illustrating a state in which the nail 2 approaches the secondary battery 1 according to an embodiment, and FIG. 7 is a schematic view illustrating a state in which the nail 2 passes through the secondary battery 1 according to an embodiment of the prevent invention.

As described above, since the metal foil layer 1354 is provided in the pouch 13, and the negative electrode lead 122 is connected to the metal foil layer 1354, the metal foil layer 1354 may have a negative polarity. Thus, as illustrated in FIGS. 6 and 7, even though the sharp nail 2 passes through the secondary battery 1, the metal foil layer 1354 and the positive electrode active material 1012 may contact each other first. That is, before the most dangerous short circuit between the positive electrode collector 1011 and the negative electrode active material 1022 occurs, the short circuit between the metal foil layer 1354 and the positive electrode active material 1012 may be induced first. Therefore, the heat generation rate may be reduced.

Also, the metal foil layer 1354 may be laminated all over the inside of the pouch 13. That is, the metal foil layer 1354 may have a relatively large surface area when compared to the electrode assembly 10 and be disposed at the outside. Thus, even though the metal foil layer 1354 and the positive electrode active material 1012 are short-circuited to raise a temperature of the metal foil layer 1354, heat may be easily released to the outside when compared to the short circuit that occurs within the electrode assembly 10 to raise a temperature. Therefore, the risk of the explosion may be reduced.

Figure 8:
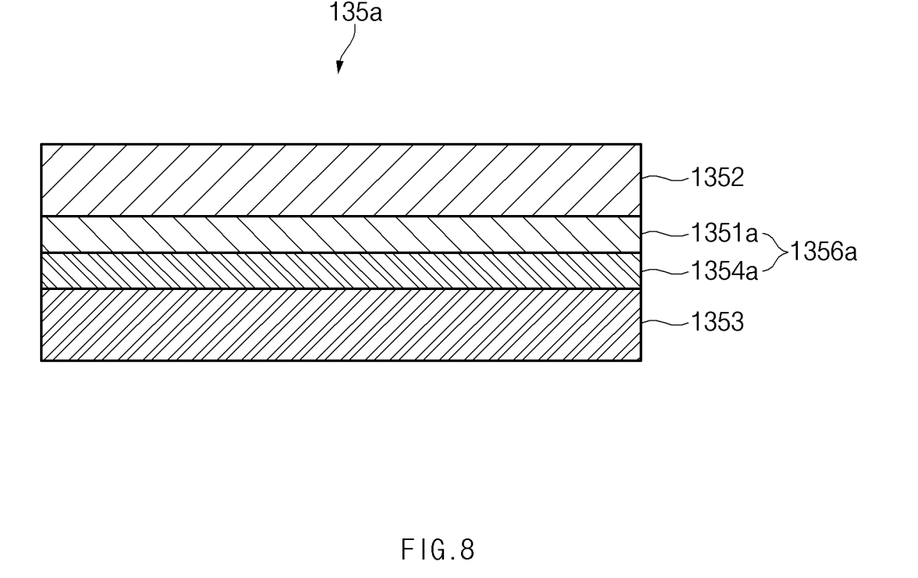
FIG. 8 is a cross-sectional view illustrating a portion of a pouch according to another embodiment of the present invention.

FIG. 8 is a partial cross-sectional view of the pouch 13 according to an embodiment of the present invention.

According to an embodiment of the present invention, the metal foil layer 1354 and the gas barrier layer 1351, which are provided in the pouch film 135, may be separate layers. Also, to prevent the gas barrier layer 1351 from having the polarity, the insulation layer 1355, which insulates the metal foil layer 1354 from the gas barrier layer 1351, may be further laminated between the metal foil layer 1354 and the gas barrier layer 1351. Thus, the metal foil layer 1354 and the gas barrier layer 1351 may not be connected to each other.

However, the first metal forming the gas barrier layer 1351 may be aluminum as described above. The aluminum has advantages that it is light in weight, has strong corrosion resistance against water or oxygen, and has weak salt resistance against salt and the like. Thus, if the sealant layer 1353 is partially broken due to deterioration of the pouch 13 or initial failure of the product, aluminum may contact the electrolyte within the pouch 13 and thus be corroded.

According to another embodiment of the present invention, a gas barrier layer 1351a and a metal foil layer 1354a, which are provided in a pouch film 135a, may be clad-rolled to be mechanically bonded to each other in a state of overlapping each other, thereby forming a clad-rolled layer 1356a. The clad is a metal rolling method in which various metals are bonded to each other to take only advantages of each metal. Here, as illustrated in FIG. 8, it is preferable that a first metal of the gas barrier layer 1351a is disposed above a second metal of the metal foil layer 1354a.

As described above, the second metal may be copper. The copper is stronger in salt water resistance than aluminum. Thus, if the gas barrier layer 1351a and the metal foil layer 1354 are clad-rolled, even if the sealant layer 1353 is partially broken, the gas barrier layer 1351 may be prevented from being corroded by the electrolyte.

Those with ordinary skill in the technical field of the present invention pertains will be understood that the present invention can be carried out in other specific forms without changing the technical idea or essential features. Therefore, the above-disclosed embodiments are to be considered illustrative and not restrictive. Accordingly, the scope of the present invention is defined by the appended claims rather than the foregoing description and the exemplary embodiments described therein. Various modifications made within the meaning of an equivalent of the claims of the invention and within the claims are to be regarded to be in the scope of the present invention.

The invention claimed is:

1. A pouch-type secondary battery comprising:
an electrode assembly in which a positive electrode, a separator, and a negative electrode are laminated, wherein a positive electrode lead extends from the positive electrode and a negative electrode lead extends from the negative electrode; and
a pouch configured to accommodate the electrode assembly, the pouch having an upper pouch and a lower pouch configured to be sealed at a sealing part,
wherein the pouch comprises:
a surface protection layer made of a first polymer and formed at an outermost layer;
a sealant layer made of a second polymer and formed at an innermost layer;
a gas barrier layer made of a first metal and laminated between the surface protection layer and the sealant layer; and
a metal foil layer made of a second metal, laminated between the surface protection layer and the sealant layer, and connected to the negative electrode of the electrode assembly,
wherein the metal foil layer is connected to the negative electrode lead extending from the negative electrode so as to be connected to the negative electrode,
wherein on each of the upper and lower pouches, portions of the surface protection layer, the sealant layer, and the gas barrier layer are removed from a specific area corresponding to an area on which the negative electrode lead exists, and
wherein the negative electrode lead has a thickness greater than a thickness of the positive electrode lead to minimize a deviation in sealing thickness at the sealing part between the positive electrode lead and the negative electrode lead.

2. The pouch-type secondary battery of claim 1, wherein the negative electrode lead is welded and connected to the metal foil layer exposed through the specific area.

3. The pouch-type secondary battery of claim 1, wherein the first polymer comprises polyethylene terephthalate (PET).

4. The pouch-type secondary battery of claim 1, wherein the first metal comprises aluminum.

5. The pouch-type secondary battery of claim 1, wherein the second metal comprises the same kind of metal as a metal contained in a negative electrode collector of the negative electrode.

6. The pouch-type secondary battery of claim 5, wherein the second metal comprises copper.

7. The pouch-type secondary battery of claim 1, wherein the second polymer comprises polypropylene.

8. A battery module comprising the pouch-type secondary battery of claim 1 as a unit battery.

9. A battery pack comprising the battery module of claim 8.

10. A device comprising the battery pack of claim 9.

11. The device of claim 10, wherein the device comprises a computer, a notebook, a smart phone, a mobile phone, a tablet PC, a wearable electronic device, a power tool, an electric vehicle (EV), a hybrid electric vehicle (HEV), a plug-in hybrid electric vehicle (PHEV), or a power storage device.

12. The pouch-type secondary battery of claim 1, further comprising an insulation layer, which insulates the gas barrier layer from the metal foil layer, between the gas barrier layer and the metal foil layer.

13. The pouch-type secondary battery of claim 1, wherein the metal foil layer is clad-rolled together with the gas barrier layer.

* * * * *